June 5, 1934.  W. C. FURNAS  1,961,850

SHEAVE STRUCTURE

Filed Dec. 26, 1930

Inventor
W. C. Furnas
by
Attorney

Patented June 5, 1934

1,961,850

UNITED STATES PATENT OFFICE 1,961,850

SHEAVE STRUCTURE

William C. Furnas, West Allis, Wis., assignor to Allis-Chalmers Manufacturing Company, Milwaukee, Wis., a corporation of Delaware Application December 26, 1930, Serial No. 504,811

21 Claims. (Cl. 64—17)

This invention relates in general to the art of pulleys and relates more specifically to improvements in the construction of multiple groove sheaves formed of a plurality of identical groove forming members selectively received by and secured to a substantial thimble adapted to be mounted on a shaft or other power transmitting element.

An object of the invention is to provide a sheave wherein a plurality of groove forming members preferably of sheet metal and of identical shape and formation are selectively received by a thimble for the purpose of supporting a selected number thereof to permit of adjustment in the number of grooves desired therein.

Another object of the invention is to provide a sheave having a thimble for supporting a plurality of hollow, circular, groove forming members of identical shape and formation wherein a relative rotation of said members and said thimble is precluded directly by said members and said thimble and without the necessity of providing heavy bolt receiving flanges on the thimble.

Another object of the invention is to provide a selective groove sheave wherein the adjacent groove side walls for adjacent grooves are in hollow, circular members contacting in their operative assembled relation on the supporting thimble, at their inner and outer peripheral edge portions.

Another object of the invention is to provide a multiple groove sheave in which the grooves are shaped to receive V-belts.

Another object of the invention is to provide a multiple groove sheave including a plurality of sheet-metal groove forming members of like formation, in which the axial spacing of the grooves is provided directly by the cooperating groove forming members and without the addition of separate elements.

Another object of the invention is to provide a selective groove sheave that is simple in construction, light in weight yet durable in construction, efficient in operation and inexpensive.

Other objects and advantages of the present invention will be apparent from a consideration of the detailed description hereinafter found in this specification when taken in connection with the accompanying drawing wherein a preferred embodiment of this invention is shown and in which like characters of reference refer to similar parts in all of the several views.

Figure 1:
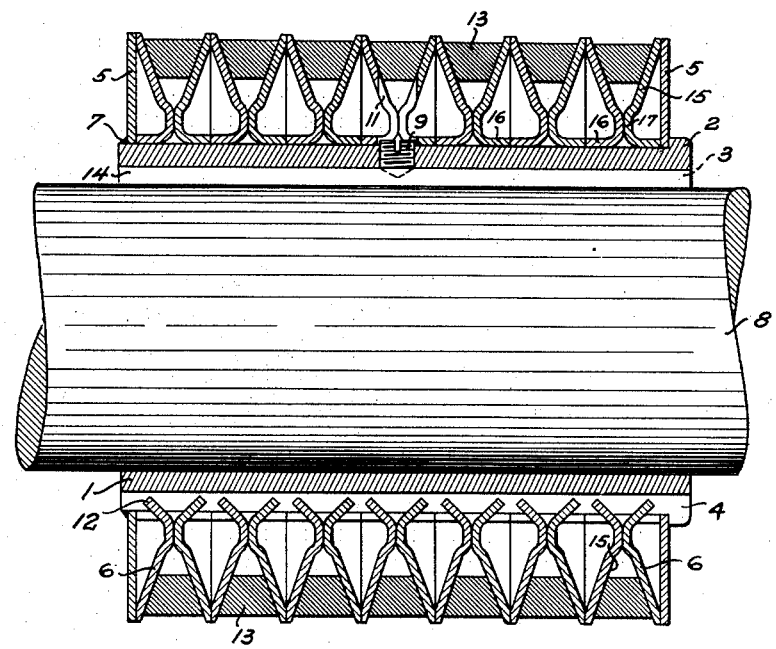
Fig. 1 is a central longitudinal cross-section through a sheave embodying this invention, and shows the same applied to a power shaft.

Referring to Fig. 1 reference numeral 1 designates a cylindrical thimble having an external, annular abutment 2 at one end thereof, the other end being free so that a selected number of circular, groove forming members 6 preferably of sheet steel and of like formation and size may readily be slipped along the outer surface of thimble 1. In order to prevent relative rotation between the thimble 1 and the groove forming members 6 mounted thereon, the thimble is provided with one or more peripheral axial slot or slots 4 which snugly receive lugs 12 struck from the inner peripheral or flange portions 16 of members 6. The thimble 1 is further provided with an inner peripheral keyway or slot 3, preferably diametrically disposed therein with respect to the slot 4, in which is fitted a key or feather 14 a portion of which is located in a corresponding, registering keyway in the power shaft 8 for the purpose of fixedly securing the built up sheave thereto.

Before assembling a selected number of groove forming members 6 on the thimble 1, it is preferable to apply a ring or washer 5 thereon. This ring 5 engages the annular abutment 2 of the thimble 1 and restrains the bending movement of the groove side wall portion 15 of the member 6, which bears against the ring, when the groove is carrying a belt 13 and also prevents damage to the outer groove side wall. Another member 6 disposed oppositely from that of the member 6 first applied is then slipped along the outer surface of the thimble 1 and this method of assembling the members 6 is repeated, with alternate members disposed alike, until the desired number of grooves are provided. The members 6 are then preferably pressed against the abutment 2 in a suitable fixture, after which another ring 5 like the ring 5 just described is slipped over the uncovered outer surface of the thimble 1 and held firmly in engagement with the adjacent member 6. Then the adjacent outer surface of the thimble 1 may be welded to said latter ring 5 by forming an annular weld section 7 thereon to hold the series of groove forming members 6 against axial movement.

In order to prevent displacement of the key or feather 14 with respect to the thimble 1 when the assembled sheave is mounted upon the power shaft 8, the thimble 1 is provided with a radial, threaded bore communicating with the slot 3, in which a set screw 9 may be inserted, the end of which bears against the key or directly against the shaft. To facilitate operation of the set screw 9 the groove forming members 6 which lap the threaded bore which receives the set screw 9 are provided with a drilled opening 11 in alignment with said threaded bore but preferably of a larger diameter.

As stated before each groove forming member 6 is preferably stamped out of a piece of sheet steel and is of a circular form. The cross-section thereof being substantially defined by a straight line groove-forming side wall portion 15 and a thimble-receiving annular flange portion 16, the former being directed at an acute angle to said latter thimble receiving flange portion 16. In order to stiffen the member 6 and locate the point or points of contact between the adjacent identical members 6 of a sheave from the plane of said flange portion 16 each member 6 is further provided with an intermediate or contact portion 17 extending slightly outwardly beyond the plane of the side wall portion 15.

Further, in order that the relatively light and thin groove forming members 6 in their assembled relation shall produce and maintain uniform grooves for the V-type belts operating therein when they are transmitting variable loads, they are provided with relatively extensive, edge-contact surfaces at their open, hollow sides, said contacting surfaces being located at different radial distances from the axis of the thimble 1. This is accomplished by machining, as by grinding, the open, hollow sides of each member 6 so that all points in the edges thereof lie in the same plane. This results in rings of contact between the flange portions 16 of the open side, opposed groove-forming members as well as between the same portions of the outer or end groove-forming members 6 and the rings 5, with simultaneous, constant, enlarged rings of contact between the engaging side wall portions 15 of the said open sided, opposed groove-forming members as well as between these same portions of the outer or end groove-forming members 6 and the rings 5, in each sheave.

Figure 2:
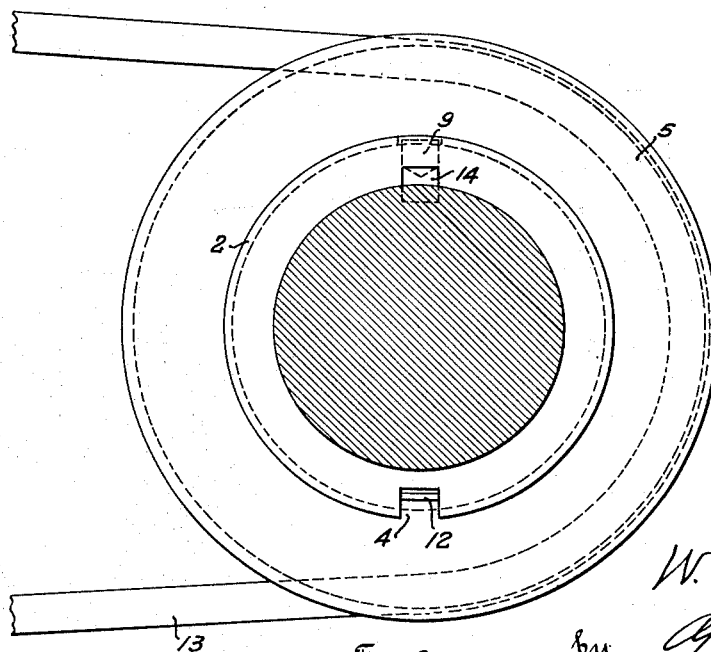
Fig. 2 is an end view of the sheave, with the shaft in section.

Referring to Fig. 2 it will be seen that the struck-out portions 12 of the flange portions 16 of each member 6 are of just sufficient width to be snugly received by the side walls in thimble 1 which bound the slot 4 formed therein. By bending the struck-out portions 12 slightly inwardly with respect to the remaining material of the flange portions 16 a sufficient engagement between these portions 12 and the side walls of the slot 4 may be realized to effect a secure, positive locking of the assembled groove-forming members and prevent their relative rotation with respect to the thimble 1 under normal operating conditions of the sheave.

Although the drawing shows a seven groove sheave it is to be understood that this is an illustrative rather than a limiting showing of the invention, since any odd or even number of grooves may be provided in a sheave structure constructed according to this invention.

It should be further understood that it is not desired to limit the invention to the exact details of construction herein shown and described, for various modifications within the scope of the claims may occur to persons skilled in the art.

It is claimed and desired to secure by Letters Patent:

1. In a sheave, a cylindrical thimble, a plurality of hollow, open sided, circular, groove forming members of sheet metal mounted on said thimble, a pair of said members being disposed with their open sides in facing relation, the said sides of said pair being in contacting relation and mutually contacting in edges located at different radial distances from the axis of said thimble.

2. In a sheave, a cylindrical thimble, a plurality of pairs of hollow, open sided, circular, groove forming members of sheet metal mounted on said thimble, a plurality of pairs of said members being disposed with their open sides in facing relation, the said sides of each of said pairs being in contacting relation and mutually contacting in edges located at different radial distances from the axis of said thimble.

3. In a sheave, a cylindrical thimble having an end abutment, a ring on said thimble and engaging said abutment, and a hollow, open sided, circular member of sheet metal and provided with a groove forming portion, having its open side facing said ring, said member being in contacting relation with said ring and contacting in edges located at different radial distances from the axis of said thimble.

4. In a sheave, a cylindrical thimble, a pair of circular, groove forming members mounted on said thimble, each of said members having an annular, thimble-surrounding flange portion, said thimble being provided with an axial slot adjacent said flange portions, and said members having struck-out portions entering said slot.

5. In a sheave, a cylindrical thimble, a plurality of pairs of circular, groove forming members mounted on said thimble, each of said members having an annular, thimble-surrounding flange portion, said thimble being provided with an exterior axial slot, and said annular portions having struck-out portions entering said slot.

6. In a sheave, a cylindrical thimble, a plurality of hollow, open sided, circular, groove forming sheet metal members mounted on said thimble, each of said members comprising a groove forming side wall portion, a thimble-surrounding, annular flange portion, making an acute angle with said former portion, and an intermediate, adjacent member-contacting portion formed for substantial surface contact with an adjacent member.

7. As an article of manufacture, a hollow, open sided, circular member having a groove forming side wall portion, an annular flange portion, making an acute angle with said side wall portion, and an intermediate substantial surface portion, the edges of said circular member at the open, hollow side thereof being located in the same plane.

8. In a sheave, a cylindrical thimble, a plurality of hollow, open sided, circular, groove forming members mounted on said thimble, each of said members having an axially extending, thimble engaging flange portion and a groove forming side wall portion, and means comprising an abutment and a weld section engaging respectively, a ring at the abutment and a ring at the weld section portion of said thimble, for restraining axial displacements of said members on said thimble when the sheave is transmitting power, said rings engaging said side wall portions and said thimble engaging flange portions of said members.

9. A sheave comprising a bound collection of sheet metal discs formed with deflected rim portions and arranged in pairs having their rim portions diverging to provide belt races, the adjacent discs of adjacent pairs being formed inwardly of their rim portions with cooperating abutment portions axially offset from the opposite faces of the discs.

10. A sheave comprising a bound collection of sheet metal discs formed with deflected rim portions and arranged in pairs having their rim portions diverging to provide belt races, said discs being formed inwardly of their rim portions with axially spaced portions providing opposite abutment faces, the abutment face portions of adjacent discs cooperating for positioning the discs and transmitting the compressive strains due to the binding.

11. A sheave comprising a bound collection of sheet metal discs formed with deflected rim portions and arranged in pairs having their rim portions diverging to provide belt races, said discs being formed inwardly of their rim portions with axially spaced portions providing opposite abutment faces in parallel planes, and the discs being wholly within the spaces bounded by said planes.

12. A sheave comprising a bound collection of uniform pressed steel discs formed with axially spaced portions providing opposite abutment faces and with deflected rim portions, said discs arranged alternately face to face and back to back, every intermediate disc of the collection having its abutment faces cooperating with the corresponding abutment faces of the adjacent discs.

13. A sheave comprising a bound collection of sheet metal discs formed with deflected rim portions and offset portions carrying the said rim portions which are deflected toward but do not project beyond the opposite sides of the discs being all of the same size and form and, said discs arranged alternately face to face and back to back and cooperating with one another to transmit the compression of the binding inwardly of the deflected disc rims.

14. A sheave comprising a bound collection of pressed steel discs formed with deflected rims, said collection embodying a plurality of such discs arranged in pairs, each pair of discs abutting and symmetrically disposed with their rims diverging, and the adjacent pairs abutting at adjacent rim margins, said collection further embodying end discs having their rim margins abutting the rim margins of the discs adjacent thereto, the structure also embodying provision whereby the compression due to the binding of the discs together is sustained centrally or inwardly of the disc rims sufficiently to relieve the rims from undue compressive strain and prevent material distortion of the discs by the compressive action of the binding.

15. A sheave comprising a collection of sheet metal discs formed with central portions providing abutment faces and with surrounding axially offset portions providing opposite abutment faces and with deflected rim portions extending from said offset portions toward but not projecting beyond the planes of said first named abutment faces, said discs arranged alternately face to face and back to back, and means cooperating with the central portions of the end discs by which the whole series of discs are bound together.

16. A sheave having a hub and a plurality of uniform sheet metal discs bound in assembly on the hub, said discs having intermediate portions providing front abutment faces at right angles to the hub and being formed with inner hub-engaging portions arranged rearwardly of said intermediate portions and with inclined portions extending outwardly and rearwardly from said intermediate portions, the outer marginal portions of the discs having back abutment faces parallel with the front abutment faces, said discs arranged alternately face to face and back to back with the corresponding abutment faces of adjacent discs cooperating and the inclined portions of confronting discs diverging to form complemental belt race walls.

17. A sheave having a hub, a plurality of uniform sheet metal discs each formed with concentric axially spaced portions providing front and back abutment faces and with surrounding inclined portions arranged between the planes of said faces, said discs arranged alternately face to face and back to back on said hub, and means binding the discs in assembly on the hub, every intermediate disc having its said abutment faces cooperating with the corresponding abutment faces of the adjacent discs, and adjacent confronting discs having their said inclined portions diverging and forming complemental parts of a belt race.

18. A sheaving having a hub, a plurality of sheet metal discs assembled in pairs on the hub, each pair of discs having cooperating front abutment portions and surrounding diverging portions providing complemental walls of a belt race, all of the intermediate discs being alike and formed inwardly of said front abutment portions with axially spaced back abutment portions, the said back abutment portions of adjacent discs of adjacent pairs cooperating, and means cooperating with the end discs whereby all the discs are bound in assembly on the hub.

19. A sheave comprising a bound collection of sheet metal discs formed with annular shouldered or upset portions stiffening the discs and providing concentric axially spaced portions affording opposite abutment faces, and with deflected rim portions the outer edges of which do not project beyond the abutment faces on the same sides of the discs, said discs being all of the same size and form and arranged alternately face to face and back to back.

20. A sheave comprising a bound collection of sheet metal discs of uniform size and shape formed with deflected rim portions and portions inwardly thereof providing abutment faces flush with the outer edges of the discs, said discs arranged alternately face to face and back to back.

21. A sheave comprising a collection of sheet metal discs formed with annular shoulders and deflected rim portions not projecting beyond the planes of the back faces of the discs, said discs being arranged alternately face to face and back to back, the confronting discs cooperating to provide belt races and abutting one another adjacent to the belt races and abutting the adjacent discs centrally, and a hub comprising a sleeve having the collection of discs secured thereon in fixed position and in driving connection therewith.

WILLIAM C. FURNAS.